United States Patent [19]
Kim

[11] Patent Number: 5,596,422
[45] Date of Patent: Jan. 21, 1997

[54] NTSC OR PAL SIGNAL DETECTING CIRCUIT OF A LASER DISK PLAYER SYSTEM

[75] Inventor: Chun-Sup Kim, Suwon, Rep. of Korea

[73] Assignee: Samsung Electronics Co., Ltd., Kyungki-do, Rep. of Korea

[21] Appl. No.: 330,791

[22] Filed: Oct. 28, 1994

[30]     Foreign Application Priority Data

Oct. 30, 1993 [KR] Rep. of Korea ............... 1993-22933

[51] Int. Cl.$^6$ ................. H04N 5/76; H04N 5/46
[52] U.S. Cl. ................. 386/26; 348/558; 386/46
[58] Field of Search ................. 358/342, 335; 348/558

[56]         References Cited

U.S. PATENT DOCUMENTS

| | | | |
|---|---|---|---|
| 4,864,427 | 9/1989 | Tanaka et al. | 358/342 |
| 4,914,523 | 4/1990 | Maruta | 358/310 |
| 5,166,807 | 11/1992 | Masuda et al. | 358/342 |

FOREIGN PATENT DOCUMENTS 2-180474   7/1990   Japan ................. 348/558

*Primary Examiner*—Tommy P. Chin
*Assistant Examiner*—Luanne P. Din
*Attorney, Agent, or Firm*—Sughrue, Mion, Zinn, Macpeak & Seas

[57]         ABSTRACT

A circuit for detecting an NTSC signal or a PAL signal in a laser disk player system. In the laser disk player system, the circuit includes an FM video signal processing part for shaping a waveform of the FM video signal picked-up from the optical pick-up part and for outputting the waveform shaped signal; a BPF (Band Pass Filter) and integrator for filtering and integrating the FM video signal shaped in the waveform from the FM video signal processing part, and for outputting an integral value in the form of an electrical signal; and a comparator for comparing the integral value outputted from the BPF and integrator with a determined reference voltage, and for outputting an NTSC or PAL detecting signal. Thereby, the NTSC or PAL signal can be detected quickly.

4 Claims, 2 Drawing Sheets

NTSC OR PAL SIGNAL DETECTING CIRCUIT OF A LASER DISK PLAYER SYSTEM

BACKGROUND OF THE INVENTION

The present invention relates to a circuit for detecting an NTSC (National Television System Committee) signal or a PAL (Phase Alternation by Line) signal in a laser disk player system, and more particularly to a circuit for detecting the presence of an NTSC or PAL signal by using a waveform shaped FM (Frequency Modulation) video signal shaped.

Generally, in a laser disk player system, a video signal recorded on a disk is picked up, and an NTSC or PAL signal is detected from an FM-demodulated signal. NTSC and PAL signals have different frequency bands. An example of such a disk player system is shown in U.S. Pat. No. 4,914,523 issued Apr. 3, 1990 to Maruta and entitled OPTICAL DISK APPARATUS COMPATIBLE WITH DIFFERENT TELEVISION SYSTEM STANDARDS. U.S. Pat. No. 4,914,523 discloses an optical disk player for use with optical disks having color video information recorded thereon, which avoids playing back an optical disk on which is recorded color video information according to a TV system other than that for which the player is intended.

The NTSC video signal has a frequency spectrum such as shown in FIG. 1. There are 525 horizontal synchronizing signals per second, and 60 vertical synchronizing signals per second. The PAL video signal has a frequency spectrum such as shown in FIG. 2. Here, there are 625 horizontal synchronizing signals per second and 50 vertical synchronizing signals per second.

FIG. 3 is a circuit diagram for detecting the NTSC or PAL signal in a conventional laser disk player system. Referring to FIG. 3, an optical pick-up part 1 picks up a video signal from the disk and outputs a signal to an FM video signal processing part 2. The waveform of the video signal outputted from the optical pick-up part 1 is shaped by the FM video signal processing part 2. The FM video signal is demodulated by an FM video signal demodulator 3, and then is outputted as a composite video signal. A synchronization separator 4 receives the composite video signal and separates a synchronizing signal from the composite video signal. A synchronization detector 5 receives the synchronizing signal and detects the horizontal synchronizing signal or the vertical synchronizing signal. A MICOM (microcomputer) 6 receives the horizontal synchronizing signal or the vertical synchronizing signal outputted from the synchronization detector 5, and detects the presence of an NTSC or a PAL signal by counting the synchronizing signal. For example, the MICOM 6 inputs the horizontal synchronizing signal separated from the synchronization separator 4, counts the horizontal synchronizing signal, and if the horizontal synchronizing signal is 525 per second, the MICOM 6 detects the presence of an NTSC signal. If the horizontal synchronizing signal is 625 per second, the MICOM 6 detects the presence of a PAL signal. However, if the MICOM 6 inputs the vertical synchronizing signal separated from the synchronization separator 4 and counts the vertical synchronizing signal, and if the vertical synchronizing signal is 60 per second, the MICOM 6 detects the presence of an NTSC signal. If the vertical synchronizing signal is 50 per second, the MICOM 6 detects the presence of a PAL signal.

Meanwhile, in FIG. 3, which shows the conventional circuit for detecting the presence of an NTSC or a PAL signal, the synchronizing signal is obtained after the FM video signal demodulator outputs the composite video signal, after which the synchronizing signal is counted and detected. Therefore, since there is necessarily a waiting time during the counting of the synchronizing signal, not only is the speed for detecting the NTSC or PAL signal diminished, but also transient phenomena are experienced by a servo part of the disk during the waiting period. Therefore, there are problems in the conventional NTSC or PAL signal detecting circuit.

SUMMARY OF THE INVENTION

It is therefore an object of the present invention to provide a circuit for detecting an NTSC signal or a PAL signal quickly by sensing a frequency band in a laser disk player system.

It is another object of the present invention to provide a circuit for detecting the NTSC or PAL signal from a video signal before an FM demodulation in the laser disk player system so that a transient state of the system may be prevented.

The present invention for achieving the aforementioned objects comprises an optical pick-up part for picking up an FM video signal from a disk; an FM video signal processing part for shaping a waveform of the FM video signal picked-up from the optical pick-up part and for outputting the signal shaped in the waveform; a BPF (Band Pass Filter) and integrator for filtering and integrating the waveform shaped FM video signal from the FM video signal processing part, and for outputting an integral value in the form of an electrical signal; and a comparator for comparing the integral value outputted from the BPF and integrator with a determined reference voltage, and for outputting an NTSC or PAL detecting signal.

BRIEF DESCRIPTION OF THE DRAWINGS

The above objects and other advantages of the present invention will become more apparent by describing the preferred embodiment of the present invention with reference to the attached drawings, in which.

DETAILED DESCRIPTION OF THE INVENTION

In the following description, specific details are set forth to provide a more thorough understanding of the present invention. It will be apparent, however, to one skilled in the art, that the present invention may be practiced without these specific details. In other instances, well known circuits have not been described so as not to obscure the present invention.

Figure 1:
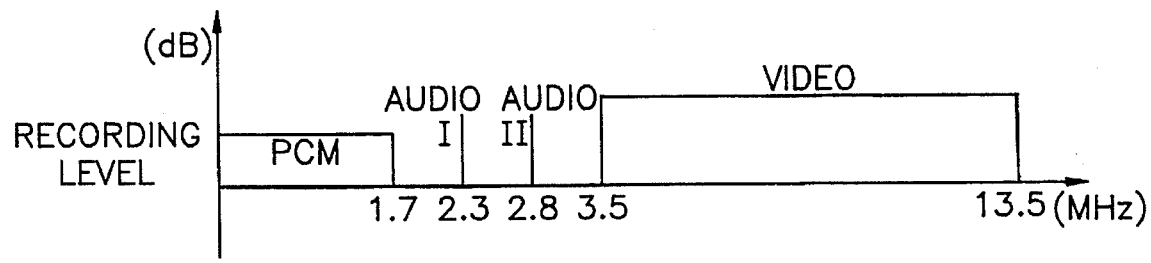
FIG. 1 is a frequency spectrum diagram of an NTSC (National Television System Committee) video signal.
Figure 2:
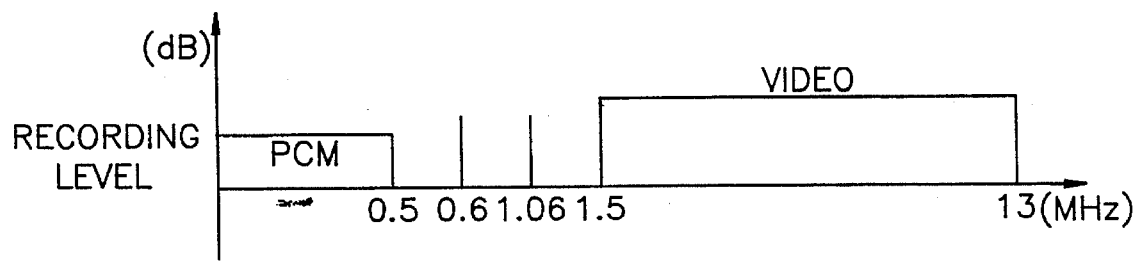
FIG. 2 is a frequency spectrum diagram of a PAL (Phase Alternation by Line) video signal.
Figure 3:
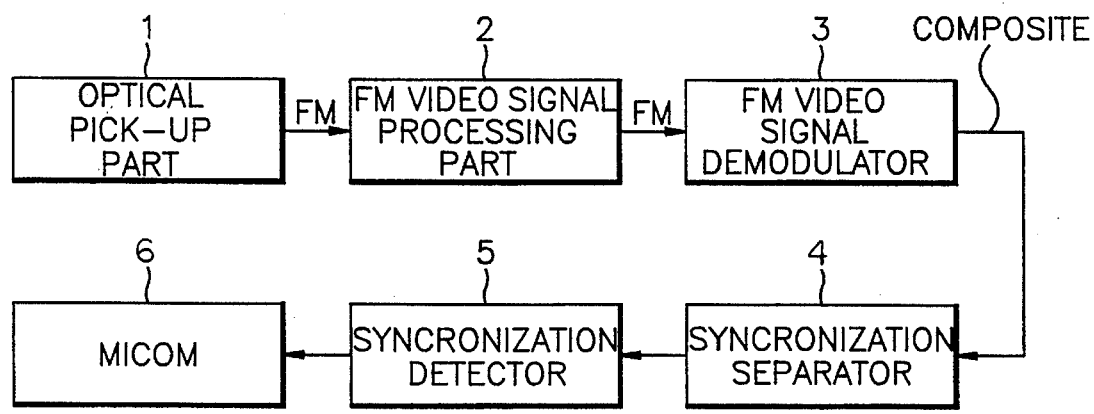
FIG. 3 is a conventional circuit diagram for detecting the NTSC or PAL signal.
Figure 4:
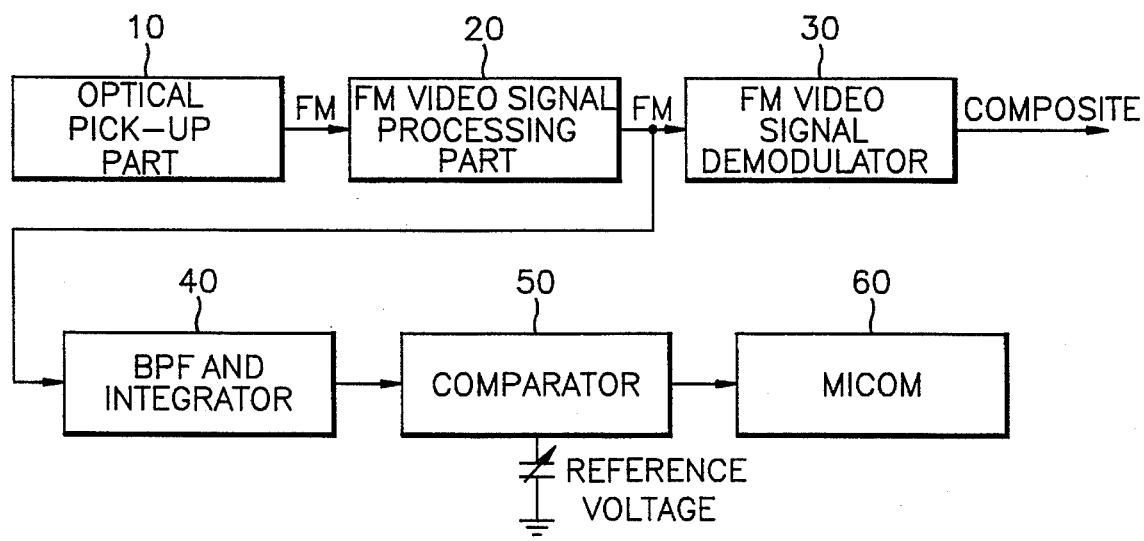
FIG. 4 is a circuit diagram for detecting the NTSC or PAL signal according to the present invention.

FIG. 4 is a circuit diagram for detecting an NTSC signal or a PAL signal according to the present invention. Referring to FIG. 4, the circuit comprises an optical pick-up part 10 for picking up an FM video signal from a disk; an FM video signal processing part 20 for shaping a waveform of the FM video signal picked up by the optical pick-up part 10 and for outputting the waveform shaped signal; an FM video signal demodulator 30 for demodulating and outputting the FM video waveform shaped signal from the FM video signal processing part 20; a BPF and integrator 40 for filtering and integrating the FM video signal outputted from the FM video signal demodulator 30 and for outputting an integral value in the form of an electrical signal; a comparator 50 for comparing the integral value outputted from the BPF and integrator 40 with a determined reference voltage, and for outputting an NTSC or PAL detecting signal; and a MICOM 60 for inputting the NTSC or PAL detecting signal outputted from the comparator 50 and for discriminating the NTSC or PAL signal.

Referring to FIG. 4, the preferred embodiment of the present invention will now be described in detail. The optical pick-up part 10 picks up the video signal from the disk. The video signal picked up by the optical pick-up part 10 is outputted as the FM video waveform shaped signal from the FM video signal processing part 20. The waveform shaped FM video signal is demodulated in the FM video demodulator 30, and then is outputted as the composite video signal. The BPF and integrator 40 receive the processed FM video signal, perform the band filtering of the FM video signal, and then integrate the portion of the FM video signal which is passed. Thus, the BPF and integrator 40 output the integral value as DC (direct current). The comparator 50 compares the integral value outputted from the BPF and integrator 40 with the determined reference voltage, and then outputs the NTSC or PAL detecting signal. The MICOM 60 for inputting the NTSC or PAL detecting signal outputted from the comparator 50 discriminates the NTSC or PAL signal.

If the NTSC signal is inputted to the BPF and integrator 40, the NTSC signal is removed by the band filtering and is converted into an integral value, and then the integral value is applied to the comparator 50. At this time, since the integral value is lower than the determined reference voltage, the comparator 50 outputs a low signal. When the low signal is outputted from the comparator 50, the MICOM 60 determines the presence of the NTSC signal.

Meanwhile, if the PAL signal is inputted to the BPF and integrator 40, the inputted PAL signal is generated as a signal from 1.7 MHZ to 2.5 MHZ by the band filtering, and is outputted as the integral value. Since this integral value is higher than the determined reference voltage, the comparator 50 outputs a high signal. When the high signal is outputted from the comparator 50, the MICOM 60 determines the presence of the PAL signal.

As discussed above, in the laser disk player system, the present invention processes the video signal recorded on a recording material such as a laser disk, and uses the waveform shaped signal before demodulation to detect the NTSC signal or the PAL signal. Thereby, the present invention has the advantage of not only reducing expenses by simplifying hardware, but also improving stability of the system by quickly detecting the NTSC or PAL signal without the delay resulting from conventional counting.

What is claimed is:

1. A circuit for detecting one of an NTSC signal and a PAL signal in a laser disk player system, comprising:

video signal processing means for shaping a waveform of a frequency modulation video signal and for outputting a resulting shaped waveform;

filtering means for filtering the shaped waveform;

integrating means for integrating the filtered signal and for outputting a resulting integral value in the form of an electrical signal; and comparing means for comparing the integral value outputted from said integrating means with a predetermined reference voltage, and for outputting the NTSC detecting signal or the PAL detecting signal in accordance with the comparison.

2. The circuit as claimed in claim 1, wherein said filtering means has a frequency band ranging from 1.7 MHz to 2.3 MHz.

3. A circuit for detecting one of an NTSC signal and a PAL signal in a disk player system, comprising:

an optical pick-up part for picking up a frequency modulation video signal from a disk;

a video signal processing part for shaping a waveform of the frequency modulation video signal picked up by said optical pick-up part and for outputting the frequency modulation waveform shaped video signal;

a band pass filter for filtering the frequency modulation waveform shaped video signal outputted from said video signal processing part;

an integrator for integrating the filtered signal and for outputting a resulting integral value;

a comparator for comparing the integral value outputted from said integrator with a predetermined reference voltage, and for outputting one of an NTSC detecting signal and a PAL detecting signal; and a controller for receiving said one of an NTSC detecting signal and a PAL detecting signal outputted from said comparator, and for determining, based on the received signal, which one of the NTSC and PAL signals is in the frequency modulation video signal.

4. The circuit as claimed in claim 3, wherein said filter has a frequency band ranging from 1.7 MHz to 2.3 MHz.

\* \* \* \* \*